United States Patent

[11] 3,575,352

| [72] | Inventors | Roy L. Hall<br>Palos Verdes Peninsula, Calif. (8494 Cavalier Lane, Dublin, Calif., 94566);<br>Jacob Lee, 1624 12th Ave., Los Angeles, Calif. 90019 |
|---|---|---|
| [21] | Appl. No. | 785,889 |
| [22] | Filed | Dec. 23, 1968 |
| [45] | Patented | Apr. 20, 1971 |

[54] CARBONATED BEVERAGE MIXING AND DISPENSING NOZZLE ASSEMBLY
26 Claims, 3 Drawing Figs.

[52] U.S. Cl. ..................................... 239/434.5, 239/414, 239/425, 239/590.5
[51] Int. Cl. ..................................... B05b 7/04
[50] Field of Search ........................................... 222/145, 129.1, 129.3; 239/401, 425, 426, 427, 428.5, 429, 430, 431, 432, 433, 434, 472, 575, 590, 590.3, 590.5, 600, 434.5, 439; 137/604; 239/414

[56] References Cited
UNITED STATES PATENTS

| 1,944,811 | 1/1934 | Rogers, Jr. | 222/129.3 |
| 2,401,914 | 6/1946 | Pietro | 222/145X |
| 2,619,387 | 11/1952 | Cornelius | 239/575X |
| 2,982,446 | 5/1961 | Liolios et al. | 222/145 |
| 2,993,653 | 7/1961 | Hjulian | 239/427X |
| 3,093,314 | 6/1963 | Meyer | 239/431X |
| 2,327,444 | 8/1943 | Nigbor | 239/414X |

*Primary Examiner*—M. Henson Wood, Jr.
*Assistant Examiner*—John J. Love

ABSTRACT: A nozzle for mixing and dispensing carbonated beverages, characterized by baffles, screens and orifices adapted to ensure thorough mixing of flavoring syrup and carbon dioxide charged water while allowing increased volume of mixture to be discharged with reduced foaming. The nozzle may also be used to dispense beer at a rapid rate of flow with a minimum of foaming.

Patented April 20, 1971 3,575,352

INVENTOR.
ROY L. HALL
JACOB LEE

BY

Ernest L. Brown
ATTORNEY

CARBONATED BEVERAGE MIXING AND DISPENSING NOZZLE ASSEMBLY

BACKGROUND OF THE INVENTION

This invention pertains to a means for mixing and dispensing carbonated beverages such as carbonated water, called soda water, or for dispensing beer. Typical carbonated beverage mixtures include cola drinks, root beer, fruit drinks, and the like. The carbonated water is a mixture of water and carbon dioxide which gives the drink a biting taste.

One of the problems encountered in dispensing carbonated beverages, such as soda water or beer, is that the beverage foams in the receiving container, thus preventing the complete filling of the container and limiting the speed with which the container may be filled. Further, the production of foam means that the carbon dioxide is prematurely emitted from the carbonated water, leaving the remainder of the liquid less biting than it would have been if it had retained the carbon dioxide.

A second problem that frequently occurs, when mixing dispensers are used, is that flavoring syrup which is introduced into the nozzle fails to mix thoroughly with the carbonated water. The result is a carbonated water drink in which the syrup has a tendency to stay at the bottom of the receiving container. A drink is produced which is not uniformly sweet from top to bottom of the container.

Because of the presence of carbon dioxide bubbles, the flow of carbonated beverages does not follow the laws of flow of ordinary liquids. In fact, the laws of flow are not accurately known because of the turbulence caused by the bubbles of gas. Thus, while attempts have been made to control the mixing and dispensing of carbonated beverages, even though the problems of foaming and mixing have been recognized, the problems have not been solved.

Typically carbonated water is introduced, sometimes from the side, into a nozzle which has substantially cylindrically shaped interior sides, or which has sides converging slightly toward the bottom. Usually little care is taken to prevent abrupt changes in cross section of the nozzle.

The state of the art is reflected by U.S. Pat. No. RE 23,109 which issued May 10, 1949. In the device of that patent, the carbonated water is discharged onto a disc having a plurality of holes formed in a circle around and adjacent the center thereof. Carbonated water flows slowly through the holes onto a rubber diffuser having small pores therethrough which are adapted to enlarge under the pressure of carbon dioxide while restricting the flow of water. The diffuser reduces the water pressure and discharges water onto a solid baffle which closes the central portion of the nozzle except at the outer periphery adjacent the wall of the nozzle. The baffle thereby redirects the water toward the wall of the nozzle. The water is thus diverted radially outward onto the wall of the nozzle from whence it flows downward to the discharge opening. Flavoring syrup flows through a syrup stem which has radially directed syrup ports adjacent the discharge opening of the nozzle. The syrup is discharged into the carbonated water as it leaves the nozzle. Such a nozzle not only substantially inhibits the quantity of flow of carbonated beverage, but also does not secure thorough mixing of the syrup and carbonated water. Further, the syrup ports in the syrup stem are very difficult to clean and frequently become clogged, reducing the amount of syrup in the resulting mixture.

SUMMARY OF THE INVENTION

The device of this invention is a carbonated beverage dispensing nozzle assembly which uses spaced-apart screens to direct and spread the flow of the carbonated water with a minimum of foaming. When mixed beverages are dispensed, a removable cap on the syrup stem has syrup ports which are easily cleaned and which are positioned and directed within the nozzle to achieve substantially perfect mixing of the syrup and carbonated water in a mixing chamber before the mixture is dispensed from the nozzle.

The entrance end of the nozzle is attached to sources of carbonated water or beer and, when appropriate, to a source of flavoring syrup, for example, by screwing or pressing the nozzle onto a nipple on a base block. The base block, in turn, is connected to sources of carbonated water or beer and flavoring syrup, and it has channels or conduits for directing the water, beer, and syrup to the nipple.

The inner wall of the nozzle body is typically substantially circularly symmetrical about an axis, designated the axis of flow of the nozzle. The nipple attachment at the entrance end is usually a screw or press attachment. Centrally extending along the flow axis of the nozzle, in a mixed beverage nozzle, is a syrup stem for conducting flavoring syrup to syrup ports in the end of the stem.

The syrup stem is a downwardly extending conduit, positioned and directed along the axis of flow, and having a detachable tip with syrup ports therein. Usually the syrup stem is press fit into an opening in the base block from which the stem receives flavoring syrup. In a preferred embodiment, the syrup stem is a circularly cylindrical ceramic tube. The detachable tip is pressed on or screwed onto the end of the syrup stem.

The syrup ports on the syrup stem tip are directed in a downward and radially outward direction to project the flavoring syrup toward the wall of the mixing chamber. The velocity of flow of the flavoring syrup, in a preferred embodiment, is adjusted so that the downward velocity component of the syrup is substantially equal to the downward velocity of the carbonated water so that the mixing of the syrup and the water does not produce excess agitation of the water which would produce foaming.

The preferred embodiment of the nozzle has three diffuser and directional deflecting screens spaced apart between the entrance end of the nozzle and the top of the detachable tip of the syrup stem. The screen nearest the entrance end of the nozzle is substantially planar and extends from the syrup stem to the wall of the nozzle, intercepting, spreading, and redirecting the carbonated water into a downward flow. The second screen from the entrance end of the nozzle is substantially conically shaped and extends from the syrup stem to the wall of the nozzle with a downward flare, intercepting and distributing portions of the carbonated water toward the outer wall of the nozzle. The third screen from the entrance end of the nozzle is positioned adjacent the second screen and above the removable tip of the syrup stem. The third screen extends from the syrup stem to the wall of the nozzle to intercept the carbonated water and to redirect it into a downward flow.

The inside walls of the nozzle below the third screen are preferably straight to avoid generating additional turbulence in the carbonated water. The distance between the third screen and the discharge opening of the nozzle is substantial to create a mixing chamber wherein the flavoring syrup and the carbonated water are thoroughly mixed.

In general, the carbonated water entering the nozzle has a substantial radial velocity component. The wires of the first screen intercept the radial velocity component and reduce it substantially to zero. The water then falls naturally, under gravity influence, straight down toward the second screen.

The second, or conical, screen distributes and redirects the downwardly flowing carbonated water. Because the second screen is not solid, only a portion of the water is deflected completely to the wall of the nozzle. Water striking the openings between the mesh wires proceeds straight down. Water striking a mesh wire, on the average, is deflected outward. A portion of the outwardly deflected water strikes an adjacent mesh wire which blocks the radial flow of the water and causes it to proceed through the openings in the mesh onto the third screen where the water velocity is again collimated into a straight downward velocity.

The screens are preferably noncorrosive and may be made, for example, of stainless steel. The mesh of the first screen may be larger than the mesh of the second and third screens, whereby slight radial velocity components may remain after the water passes through the first screen.

It is within the spirit of this invention if, instead of screens, one were to use two crossed grids of wires. Further, it is within the spirit of this invention to have the screen mesh variable. The preferred embodiment, however, uses a screen with a uniform mesh. The mesh is fine to collimate the water. It is also within the spirit of this invention not to require that the plane of the first and third screens be absolutely perpendicular to the axis of flow, although that is the best embodiment. Similarly the second screen may be made in the shape of a multisided pyramid instead of a true cone.

The downward angle of the syrup ports is adjusted to cause the syrup velocity downward component substantially to match the downward velocity component of the water, while the radial component of the syrup injects the syrup into the flowing water and helps to mix the syrup and the water.

In a typical embodiment, the syrup stem is made of ceramic or plastics material. The tip may be of plastics with, for example, a force fit onto the stem or a screw connection to the stem so that the tip may be removed for cleaning.

It is obvious that although the nozzle with the syrup stem is made for mixed soda water beverages that, with the removal of the syrup stem, the nozzle may be used to dispense beer and other carbonated malt liquors.

It is therefore an object of this invention to dispense carbonated beverages with a minimum of foaming.

It is another object of this invention to maintain a maximum flow rate of carbonated beverage with a minimum of foaming.

It is also an object of this invention to dispense carbonated water and flavoring syrup mixtures with an optimum mixing.

It is still another object of this invention to achieve the combination of the above-enumerated objects.

It is a specific object of this invention to provide apparatus which achieves the above-recited objects.

It is still a more specific object of this invention to achieve the above objects with a plurality of diffuser and deflecting screens.

It is also a more specific object of this invention to provide a tip for a syrup stem, having syrup ports with a downward tilt that is predetermined to cause the downward velocity of syrup flow to be substantially equal to the downward velocity of water with which the syrup is to be mixed.

BRIEF DESCRIPTION OF THE DRAWINGS

Other objects and advantages of the invention will become apparent from the following description, taken in connection with the accompanying drawings, in which.

DESCRIPTION OF THE PREFERRED EMBODIMENTS

Figure 1:
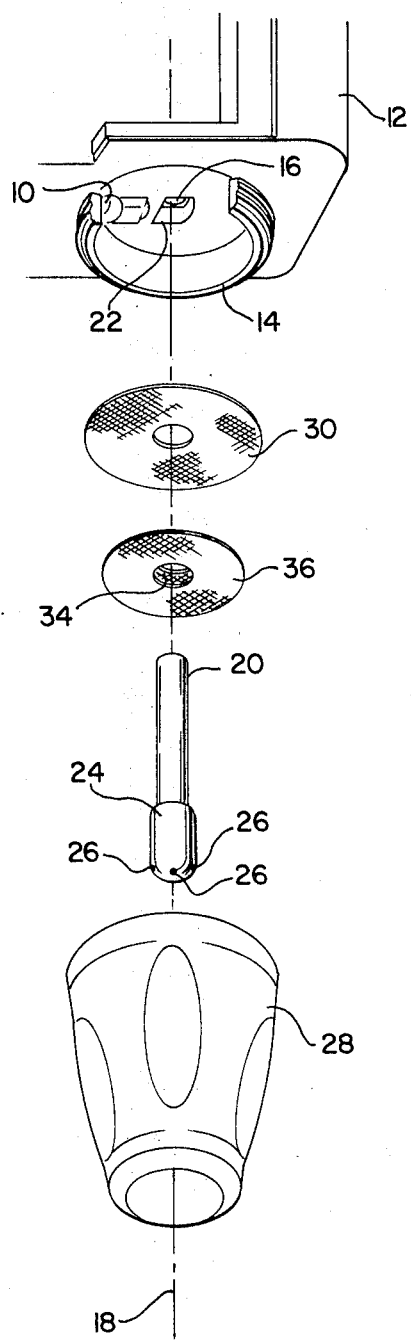
FIG. 1 is an oblique, exploded view of a preferred embodiment of this invention.
Figure 2:
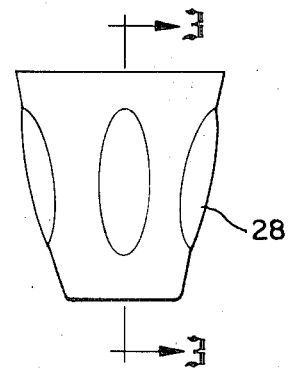
FIG. 2 is a profile view of the nozzle of this invention.
Figure 3:
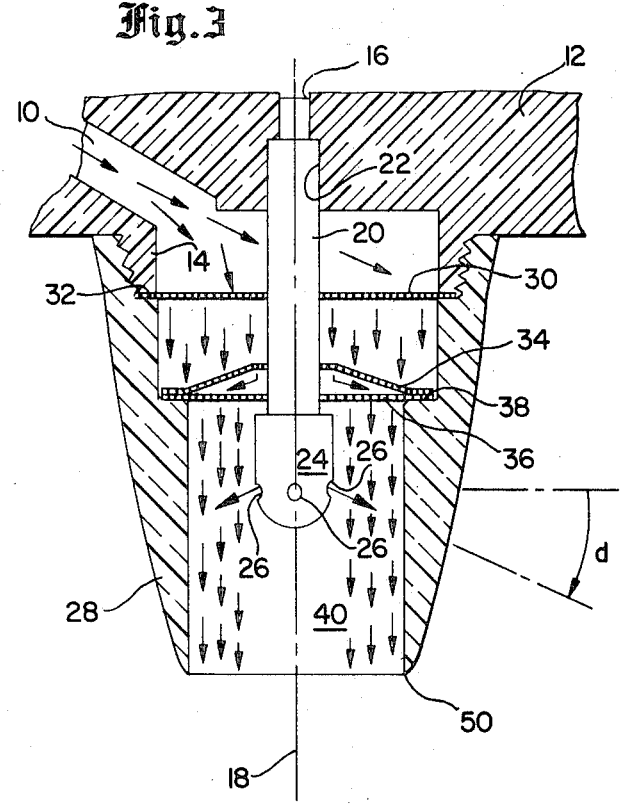
FIG. 3 is a view, partly in section, taken at 3–3 in FIG. 2.

In the FIGS., carbon dioxide charged water is channeled from a source (not shown), through a conduit 10 in a base block 12 to a nipple 14 onto which a nozzle may be attached. Flavoring syrup is channeled from a source (not shown), through conduit 16 in the base block 12 to the nipple 14. The conduit 16 introduces the syrup on the flow axis 18.

A syrup stem 20 is inserted into the opening 22 in the base block 12 to receive syrup from the conduit 16. The syrup stem 20 extends downward from the base block 12, along the flow axis 18, into the nozzle of this invention. Upon the lower end of the syrup stem 20 is a tip 24 into which syrup ports 26 have been formed. The ports 26 communicate with the interior of the stem 20 and discharge syrup into the nozzle. The tip 24 may be pressed onto the stem 20 or it may be screwed on or otherwise attached. The syrup ports 26 have axes with both radial and downward components so that syrup emitted from the ports achieves substantially the same downward velocity component as the carbonated water. Typically, the base block 12 is of ceramic material; the syrup stem 20 and tip 24 are of plastics material.

The body 28 of the nozzle screws onto the nipple 14. A first screen 30 sits on a shoulder 32 and is held between the shoulder 32 and the nipple 14. Second and third screens 34 and 36 sit on the shoulder of of the body 28. In one preferred embodiment the screens 34 and 36 are connected (e.g. by welding) together upon their outer periphery.

The first screen 30 is positioned, substantially in a plane, adjacent the entrance end of the nozzle to intercept the incoming carbon dioxide charged water from the conduit 10. The incoming water has a substantial radial, and some circumferential components of velocity. Most of the radial and circumferential components of velocity are intercepted by the screen 30 so that water below screen 30 has a velocity which is almost completely vertical. To the end of intercepting radial and circumferential velocity components, the screen 30 spreads around the syrup stem 20 from the syrup stem to the inner wall of the body 28. In some embodiments, however, sufficient clearance may be maintained adjacent the syrup stem to allow the screen 30 to be slipped over the tip 24.

In an embodiment for dispensing beer, the screen 30 would spread completely across the nozzle interior from the flow axis 18 to the inner wall of the body 28.

The screen 34 is a spreader for causing portions of the downflowing water to be directed toward the outer wall of the nozzle while other portions of the downflowing water pass through the screen 34. To that end, the screen 34 is substantially conically shaped with an outward flare toward the bottom. The screen 34 extends from the syrup stem 20 to the inner wall of the body 28, spreading around the stem 20 to intercept substantially all of the water flowing from the screen 30. In some embodiments sufficient clearance may be maintained adjacent the syrup stem to allow the screen 34 to slip over the tip 24.

Although the screen 34 has been described as conical, it is apparent that the conical shape may be approximated by a multisided pyramid. Such a pyramidal shape to the screen 34 approaches the conical shape as the number of sides of the pyramid is increased. It is intended that this invention shall encompass the concept of screen 34 being such a pyramidal shape.

In an embodiment for dispensing beer, the screen 34 would spread completely across the nozzle interior in a conical shape, with the axis of the cone substantially coinciding with the axis of flow 18, from the axis of flow to the inner wall of the body 28.

The screen 36 receives the water passing through screen 34 and redirects its velocity into a substantially pure downward component. The screen 36 spreads around the syrup stem 20 from the syrup stem to the inner wall of the body 28. In a preferred embodiment, screen 36 is attached, for example, by welding to the screen 34 on its outer periphery. In some embodiments sufficient clearance may be maintained adjacent the syrup stem to allow the screen 36 to slip over the tip 24.

Typically, the screen mesh of screens 34 and 36 is smaller than the mesh of screen 30. The wire size of the mesh of screen 30 usually needs to be larger because of the substantial bending load caused by the high pressure of the entering water in conduit 10. The loads on screens 34 and 36 are lighter. It should be noted, however, that the mesh of screens 34 and 36 should not be smaller than necessary to achieve their function, for further reduction in mesh size would unduly restrict the flow of water. Further, unduly small mesh sizes would clog from occasional dirt which might be in the water. In a typical embodiment the mesh of screen 30 is 24; the mesh of screens 34 and 36 is 30.

Preferably the screens 30, 34, and 36 should be of material which will not corrode in carbon dioxide charged water. Stainless steel screen is appropriate for this purpose.

In an alternative embodiment (not shown) the three screens may be attached together in one structure and inserted within the nozzle.

It is further contemplated by this invention that overlying crossed grids of wires are the equivalent to a screen and that such a structure is to be included within the concept of a screen means.

The nozzle body 28 forms a mixing chamber 40 within the lower portion of the nozzle. The sides of the mixing chamber 40 are preferably straight and preferably vertical to allow maximum flow of mixed beverage with a minimum of excess agitation of the carbonated water.

The tip 24 of the syrup stem 20 is positioned below the shoulder 38 and the screens 34, 36. The tip 24, however, is positioned well up into the nozzle so that a thorough mixing occurs, exposing as much of the syrup to the water as feasible within the mixing chamber 40. The syrup ports 26 have their axes tilted downward through an angle, $\alpha$, so that the syrup has a downward velocity, when it is emitted from ports 26, substantially equal to the downward velocity of the water. Alternatively, the difference in velocity may be accurately controlled to achieve thorough mixing, with minimum agitation, of the carbonated water.

In operation, the pressure of the water in the conduit 10 is controlled to give the required flow. Too low pressure would reduce the flow and defeat part of the purpose of the invention; too high pressure would cause undesirable turbulence.

The pressure of the syrup in conduit 16 is also adjusted so that the downward velocity of the cascading syrup emitted from ports 26 matches the downward velocity of the water, with just a controlled amount of velocity difference, creating as much exposure of the syrup to the water as feasible, to assure thorough mixing. The syrup is projected with a radial component toward wall of the mixing chamber 40. The syrup is washed downward by the descending water, the downward wash of the water achieving thorough mixing of syrup and water before the mixture leaves the outlet 50 of the nozzle.

To clean the ports 26 of the nozzle, the tip 24 is removed from the stem 20. The ports 26 should be cleaned periodically, preferably each day, or oftener if the syrup is allowed to dry.

Thus the invention comprises a nozzle body 28 having an entrance end connected to a nipple 14 and a discharge end 50. At least a first screen means 30 is positioned within the body 28 adjacent the entrance end to intercept the flow of liquid through the nozzle, to spread the liquid flow in the nozzle, and to suppress radial and circumferential components of liquid velocity in the nozzle. A second screen means 34 (which, in some embodiments may be the only screen), below the first screen means 30 is downwardly flared to direct portions of flowing liquid toward the inner wall of the nozzle body. A third screen means is positioned between the second screen means 34 and the discharge end or opening 50. The third screen means 36 redistributes the flow of liquid within the nozzle and redirects the liquid flow downward. The liquid is collimated into streamlines of downwardly directed flow by the screen means 30 and 36.

Although the typical nozzle is substantially symmetrical about an axis 18, it is not intended that the invention shall be avoided by making the nozzle body asymmetrical.

Further, although the screen means 30 and 36 are shown substantially perpendicular to the axis 18, it is not intended that the invention shall be avoided by merely tilting the screens.

In summary, the nozzle of this invention is adapted to dispense carbon dioxide charged beverages at a rapid rate, with a minimum of foaming, and with a thorough mixing of syrup and water, thereby providing a uniformly sweet drink. Further, the nozzle is assembled and disassembled by simply screwing the body 28 onto and off of the nipple 14. The screens 30, 34, 36 may simply slide over the tip 24 and stem 20.

Because of the simplicity of the assembly, it is evident that the cost of manufacture of such assembly is also relatively low.

Although the invention has been described in detail above, it is not intended that the invention be limited by that description, but only in accordance with the spirit and scope of the appended claims in which,

We claim:

1. A beverage dispensing nozzle assembly comprising:

A nozzle body having an entrance end and a discharge opening;

First screen means, contoured and positioned within said nozzle body adjacent said entrance end to intercept the flow of liquid through said nozzle, to spread the liquid flow in said nozzle, and to suppress radial and circumferential components of liquid velocity in said nozzle; and Second screen means, below said first screen mans and downwardly flared to direct portions of flowing liquid toward the inner wall of said nozzle body.

2. A nozzle assembly according to claim 1 and further comprising:

Third screen means, positioned between said second screen means and said discharge opening, to redistribute and downwardly redirect the flow of liquid in said nozzle.

3. A nozzle assembly as recited in claim 2 in which:

Said nozzle body has streamlines defining an axis of flow from said entrance end to said discharge opening;

Said first and third screen means are substantially perpendicular to said streamlines; and Said second screen means is substantially conically shaped with its axis substantially coaxial with one of said streamlines.

4. A nozzle assembly as recited in claim 3 in which:

Said first and third screen means comprise substantially planar screens, each substantially perpendicular to said axis of flow; and Said second screen means comprises a substantially conically shaped screen whose axis is substantially coaxial with said axis of flow.

5. A beverage dispensing nozzle assembly comprising:

A nozzle body having an entrance end and a discharge opening;

First screen means, contoured and positioned within said nozzle body adjacent said entrance end to intercept the flow of liquid through said nozzle, to spread the liquid flow in said nozzle, and to suppress radial and circumferential components of liquid velocity in said nozzle;

Second screen means, below said first screen means and downwardly flared to direct portions of flowing liquid toward the inner wall of said nozzle body;

Third screen means, positioned between said second screen means and said discharge opening, to redistribute and downwardly redirect the flow of liquid in said nozzle; and A syrup stem having a removable tip with a plurality of syrup ports in said tip for emitting flavoring syrup.

6. A nozzle assembly as recited in claim 5 in which:

Said syrup ports have their axes directed in a direction to cause the velocity of cascading syrup emitted from said ports to have a velocity component, in the direction of said axis of flow, substantially equal to the downward velocity component of water flowing through said nozzle.

7. A beverage dispensing nozzle comprising:

a nozzle body having an axis of flow directed along the streamline of said nozzle, having an entrance end for receiving at least carbonated water, and having a discharge end for discharging mixed carbonated beverages, including a mixing chamber within said nozzle body adjacent said discharge end, the interior walls of said nozzle body in the region of said mixing chamber being substantially cylindrical and substantially symmetrical about said axis of flow;

a syrup stem projecting from said entrance end into said mixing chamber substantially along said axis of flow of said nozzle;

means for collimating liquid, positioned between said tip and said entrance end of said nozzle body; and means for distributing and spreading liquid, positioned between said means for collimating liquid and said entrance end of said nozzle body.

8. A nozzle assembly as recited in claim 7 in which:

Said syrup stem has a removable tip. with syrup ports therein.

9. A nozzle assembly as recited in claim 8 in which:

Said syrup ports in said removable tip have axes with direction components parallel and perpendicular to said axis of flow.

10. A nozzle assembly as recited in claim 7 and further comprising:

A second means for collimating liquid, positioned between said means for distributing and spreading liquid and said entrance end of said nozzle body.

11. A beverage dispensing nozzle comprising:

A nozzle body having an axis of flow directed along the streamline of said nozzle, having an entrance end for receiving at least carbonated water, and having a discharge end for discharging mixed carbonated beverages, including a mixing chamber within said nozzle body adjacent said discharge end, the interior walls of said nozzle body in the region of said mixing chamber being substantially straight;

A syrup stem projecting from said entrance end into said mixing chamber substantially along said axis of flow of said nozzle, including a removable tip with syrup ports therein, said syrup ports having axes with direction components parallel and perpendicular to said axis of flow;

A first substantially planar screen substantially perpendicular to said axis of flow, extending substantially from said syrup stem to the wall of said nozzle body, positioned between said tip and said entrance end of said nozzle body;

Means for distributing and spreading liquid, positioned between said means for collimating liquid and said entrance end of said nozzle body; and A second substantially planar screen substantially perpendicular to said axis of flow, extending substantially from said syrup stem to the wall of said nozzle body, positioned between said means for distributing and spreading liquid and said entrance end of said nozzle body.

12. A nozzle assembly as recited in claim 11 in which:

Said means for distributing liquid comprises a substantially conical screen having its axis substantially coaxial with said axis of flow and flared toward said discharge end.

13. A nozzle assembly as recited in claim 12 in which:

Said screens are noncorrosive.

14. A nozzle assembly as recited in claim 13 in which:

Said screens are made of stainless steel.

15. A nozzle assembly as recited in claim 12 in which:

Said nozzle body has at least two shoulders on the inside wall thereof to position said screens axially along said axis of flow.

16. A nozzle assembly as recited in claim 12 and further comprising:

A base block having at least one nipple thereon to which said nozzle body is attached, including at least a carbonated water conduit and a syrup conduit, said syrup conduit terminating substantially in the center of said nipple.

17. Apparatus as recited in claim 16 in which said syrup stem is connected to said syrup conduit, and said water conduit terminates between said syrup stem and the region of the sidewall of said nozzle body.

18. Apparatus as recited in claim 17 and further comprising:

A flow of carbon dioxide charged water in said water conduit and a flow of flavoring syrup in said syrup conduit, the velocities of flow of said water and syrup being regulated so that the downward component of velocity of syrup emitted from said syrup ports is substantially the same as the downward velocity of said water in said mixing chamber.

19. A beverage dispensing nozzle assembly comprising:

A nozzle body having an entrance end and a discharge opening;

First screen means, contoured and positioned within said nozzle body adjacent said entrance end to intercept the flow of liquid through said nozzle, to spread the liquid flow in said nozzle, and to suppress radial and circumferential components of liquid velocity in said nozzle;

Second screen means, below said first screen means and downwardly flared to direct portions of flowing liquid toward the inner wall of said nozzle body;

Third screen means, positioned between said second screen means and said discharge opening, to redistribute and downwardly redirect the flow of liquid in said nozzle; and A syrup stem with a plurality of syrup ports in its tip for emitting flavoring syrup.

20. A nozzle assembly as recited in claim 19 in which:

Said syrup ports have their axes directed in a direction to cause the velocity of cascading syrup emitted from said ports to have a velocity component, in the direction of said axis of flow, substantially equal to the downward velocity component of water flowing through said nozzle.

21. Apparatus as recited in claim 1 in which the number of holes per unit area formed in said second screen means is substantially twice the number of holes per unit area formed in first screen means.

22. Apparatus as recited in claim 21 in which said first screen means is 24-mesh screen and said second screen means is 30-mesh screen.

23. Apparatus as recited in claim 2 in which said second and third screen means are attached together at their outer periphery.

24. Apparatus as recited in claim 2 in which the number of holes per unit area formed in said second and third screen means is substantially twice the number of holes per unit area formed in said first screen means.

25. Apparatus as recited in claim 24 in which said first screen means is 24-mesh screen and said second and third screen means are 30-mesh screen.

26. Apparatus as recited in claim 19 in which said syrup stem is positioned substantially along said axis of flow, penetrating said first, second, and third screen means.

UNITED STATES PATENT OFFICE
CERTIFICATE OF CORRECTION

Patent No. 3,575,352     Dated April 20, 1971

Inventor(s) Roy L. Hall et al.

It is certified that error appears in the above-identified patent and that said Letters Patent are hereby corrected as shown below:

Column 4, line 4, "and 36 sit on the shoulder of of th body 28. In one preferred" should read -- and 36 sit on the shoulder 38 of the body 28. In one preferred --. Column 6, line 8, "mans" should read -- means --.

Signed and sealed this 17th day of August 1971.

(SEAL)
Attest:

EDWARD M. FLETCHER, JR.
Attesting Officer

WILLIAM E. SCHUYLER, JI
Commissioner of Patent: